Jan. 24, 1967 A. CUTAIA 3,300,724

DATA REGISTER WITH PARTICULAR INTRASTAGE FEEDBACK AND TRANSFER MEANS BETWEEN STAGES TO AUTOMATICALLY ADVANCE DATA

Filed March 9, 1964 4 Sheets-Sheet 1

INVENTOR

ALFRED CUTAIA

BY Donald F. Voss

ATTORNEY

Jan. 24, 1967 A. CUTAIA 3,300,724

DATA REGISTER WITH PARTICULAR INTRASTAGE FEEDBACK AND TRANSFER MEANS BETWEEN STAGES TO AUTOMATICALLY ADVANCE DATA

Filed March 9, 1964 4 Sheets-Sheet 3

DATA REGISTER WITH PARTICULAR INTRASTAGE FEEDBACK AND TRANSFER MEANS BETWEEN STAGES TO AUTOMATICALLY ADVANCE DATA

Filed March 9, 1964

4 Sheets-Sheet 4

United States Patent Office 3,300,724

Patented Jan. 24, 1967

3,300,724

DATA REGISTER WITH PARTICULAR INTRA-STAGE FEEDBACK AND TRANSFER MEANS BETWEEN STAGES TO AUTOMATICALLY ADVANCE DATA

Alfred Cutaia, Rochester, Minn., assignor to International Business Machines Corporation, New York, N.Y., a corporation of New York Filed Mar. 9, 1964, Ser. No. 350,415
8 Claims. (Cl. 328—37)

This invention relates to data registers and more particularly to data registers where data can be entered into the register at one data rate while data already in the register can simultaneously be extracted at another data rate, if so desired, without the loss of data.

The data entered into the register propagates to the next available or non-occupied position closest to the output of the register. The output of the register is connected to a control gate which when properly conditioned will permit data to flow from the register. Upon readout of data from the register under control of the gate, data transfers within the register towards the output. Hence, it is seen that only one register position is addressed for both readin and readout of data.

Depending upon the characteristics of the apparatus for implementing the invention, the register can be made self-propagating whereby the data bits entered into the register automatically transfer to the non-occupied position closest to the register output or the propagation can be effected by continuously operating control impulses occurring at a predetermined rate.

Generally, the register is made to be self-propagating when using medium and high speed circuits. When the register is implemented as being self propagating, the bit propagation time is limited only by the inherent delay of each position in the register. If a slow speed circuit is used such as where the minimal set and reset conditioning time of the individual positions is longer than the minimal time delay of the position turn on and turn off time, it is necessary to control the rate of bit propagation. Of course, if it is desirable, controlled bit propagation can be had either for low or high speed circuits.

In addition to the type of bit propagation, the register can be of any number of positions long and each position can be either single or multi-bit for both types of bit propagation. One configuration for a multi-bit register includes a single bit control register where the number of positions in each register are equal. The control register controls the transfer of the characters entered into the multi-bit register. The control register functions so that the first character entered into the muli-bit register is propagated to the first available position oward the output of the register. Upon readout of a character, the control register enables the remaining characters to propagate one position toward the output of the register.

The register of this invention in its various forms is particularly useful for buffering data, for character input and output control, for bit character synchronization, for serial to parallel conversion and for bit generation. A particular use for the invention is shown and described in co-pending application Serial No. 306,448, filed September 4, 1963, for Document Sorting Apparatus by A. Cutaia, and assigned to the same assignee as the present invention. In the referenced application, the invention herein is utilized for asynchronous storage of multi-bit characters which identify the distribution location of documents in document sorting apparatus. When the documents arrive at a predetermined position within the document transport path, the associated document selection character is transferred from the register of this invention and thereafter is caused to track the associated document as it is transported relative to receptacles or pockets for receiving the documents.

Accordingly, it is a prime object of this invention to provide an improved data register.

Another very important object of this invention is to provide an improved data register where data can be entered into the register at one data rate while data already in the register can simultaneously be extracted at another data rate without the loss of data.

Still another very important object of the invention is to provide an improved data register where the data entered into the register propagates to the first non-occupied position closest to the output of the register.

Another object of the invention is to provide an improved data register whereby upon readout of data from the register data within the register transfers toward the output.

Yet another object of the invention is to provide an improved data register which is self-propagating whereby the data entered into the register automatically transfers to the non-occupied position closest to the output of the register.

It is still a further object of the invention to provide an improved data register where the propagation of data therewithin is limited only by the inherent delay of the apparatus comprising each position of the register.

A more specific object of the invention is to provide an improved data register which includes a multi-bit register connected under control of a single bit register, each register having an equal number of positions and the control register controls the propagation of characters within the multi-bit register whereby the characters tranfer to the non-occupied position closest to the output of the register.

The foregoing and other objects, features and advantages of the invention will be apparent from the following more particular description of preferred embodiments of the invention, as illustrated in the accompanying drawings.

Figure 3:
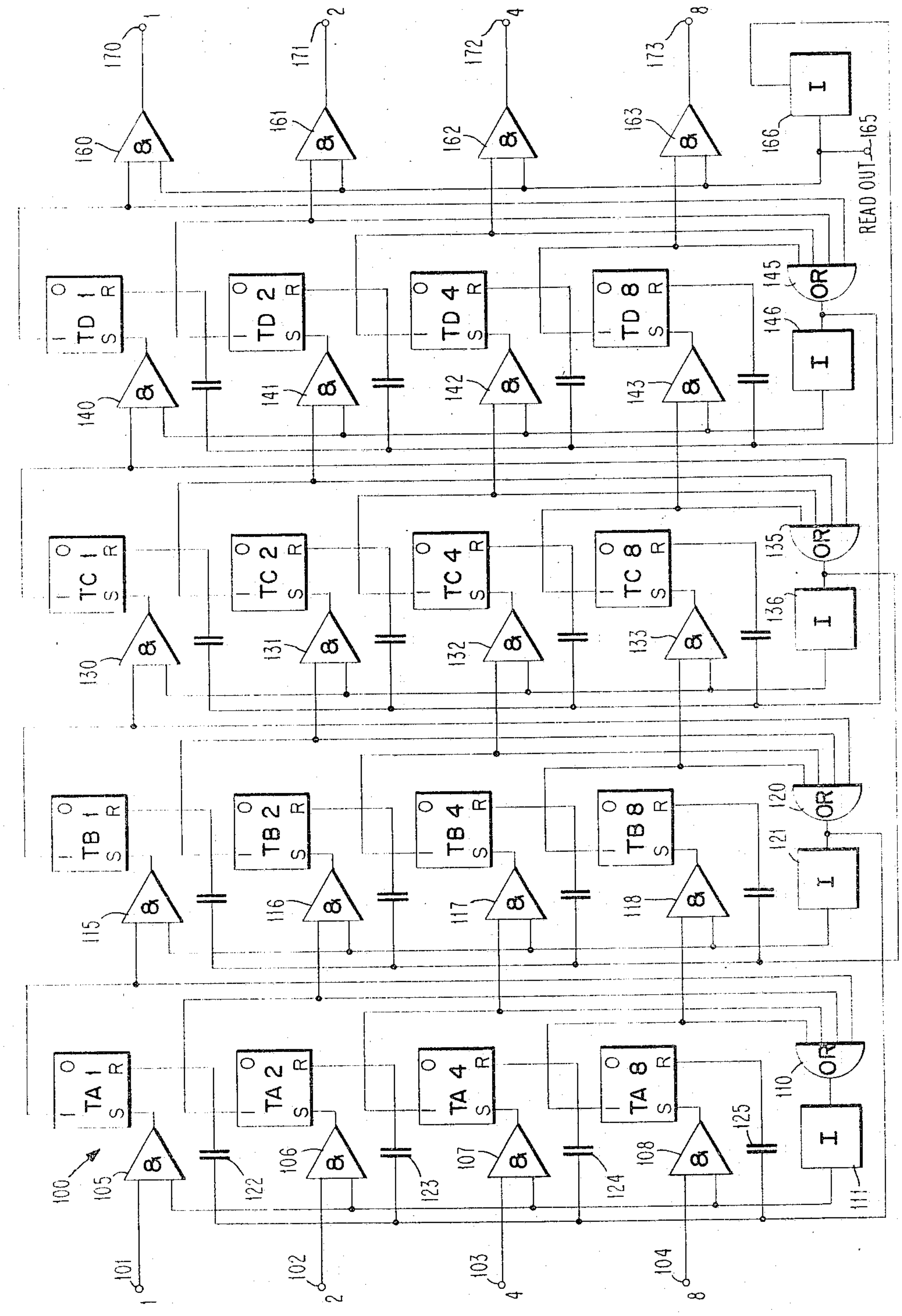
FIG. 3 is a schematic circuit diagram of a multi-bit data register embodying the invention where the register is self-propagating to cause the transfer of characters to the first non-occupied position nearest the output of the register.
Figure 5:
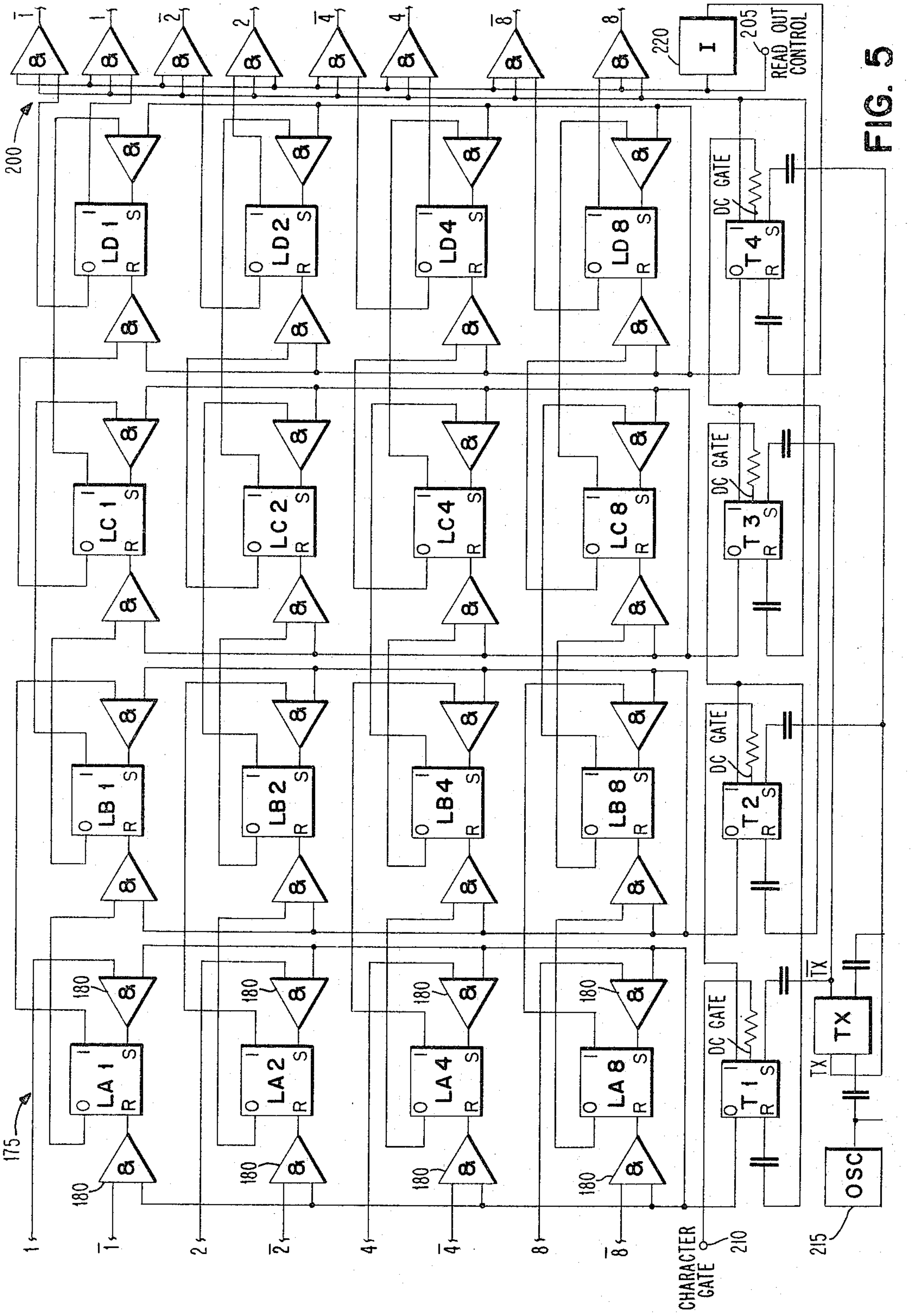

FIGS. *4a*, *4b*, *4c* and *4d* are a diagrammatic showing of how characters propagate successively through the data register of FIG. 3 including readin and readout of data therefrom; and, FIG. 5 is a schematic circuit diagram of a multi-bit register embodying the invention where a single bit control register controls the propagation of characters within the multi-bit register.

Figure 1:
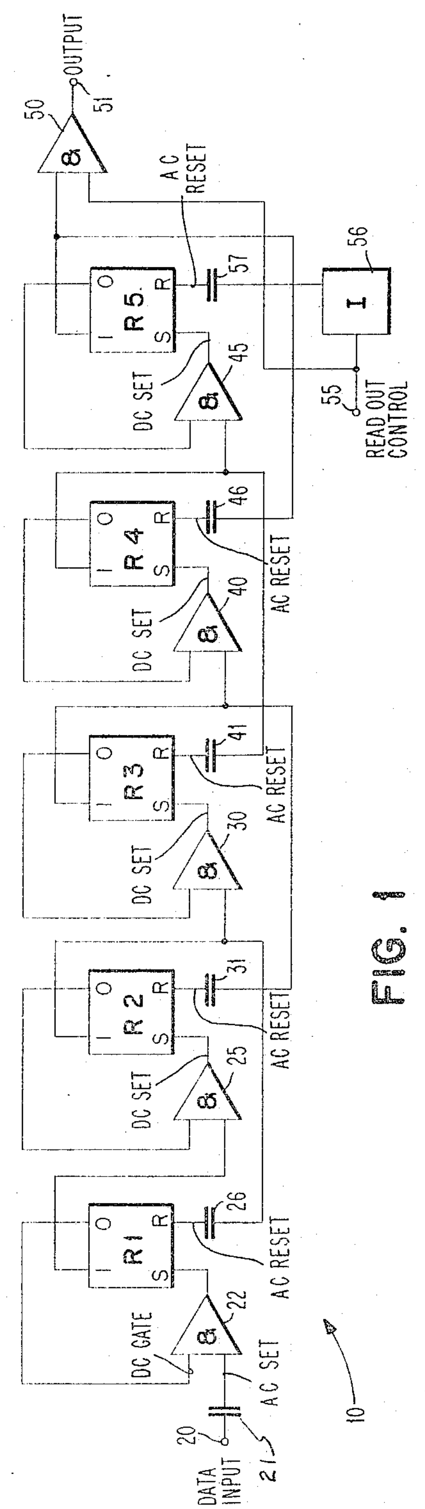
FIG. 1 is a schematic circuit diagram of a single bit register embodying the invention where the register is self-propagating to cause the transfer of data to the first non-occupied position nearest the output of the register.

With reference to the drawings, and particularly to FIG. 1, the invention is illustrated by way of example as a register 10 comprising single bit register positions R1, R2, R3, R4 and R5. The individual register positions of register 10 are bistable devices such as a trigger or latch, each having a D.C. set input and an A.C. reset input except for the register R1 which has both A.C. set and reset inputs. The A.C. set input for the register R1 is merely one of choice and a D.C. set input would be appropriate if the time duration of the input signal is of no concern.

Data bits to be entered into register 10 are applied to data input terminal 20 which is connected through a capacitor 21 as an input to a logical AND circuit 22. The logical AND circuit 22 is conditioned by the state of the position R1 which has its reset output connected to an input of the logical AND circuit 22. Hence, when the position R1 of register 10 is in the reset state, logical AND circuit 22 is conditioned to pass a signal for setting position R1. Logical AND circuit 22 under this condition will pass a signal to cause the setting of position R1 when a data bit is applied to input terminal 20.

The set output of position R1 is connected to an input of a logical AND circuit 25 which has its output connected to the set input of position R2. The reset output of position R2 is connected to an input of logical AND circuit 25 so as to condition the same. It is thus seen that with position R2 reset, it will become set right after position R1 becomes set. This, of course, assumes that position R2 is not already set. The setting of position R2 causes the resetting of position R1 because the set output of position R2 is connected through a capacitor 26 to the A.C. reset input of position R1.

The set output of position R2 is also connected to an input of a logical AND circuit 30 which has its output connected to the set input of position R3. The reset output of position R3 is connected to an input of logical AND circuit 30 so as to condition the same. Thus, position R3 will be set right after position R2 becomes set. The set output of position R3 is connected by capacitor 31 to the A.C. reset input of position R2. By this arrangement, position R2 is reset upon the setting of position R3. The set output of position R3 is also connected to an input of a logical AND circuit 40 which has its output connected to the set input of position R4. The reset output of position R4 is connected to an input of logical AND circuit 40 so as to condition the same. Position R4 becomes set right after position R3 has been set if, of course, position R4 is not already in the set state.

The set output of position R4 is connected through a capacitor 41 to the A.C. reset input of position R3. Hence, when position R4 becomes set, position R3 will be reset. The set output of position R4 is also connected to an input of a logical AND circuit 45 which has its output connected to the set input of register position R5. The reset output of position R5 is connected to another input of logical AND circuit 45. Hence, position R5 becomes set right after the setting of position R4 if R5 is not already set. The set output of position R5 is connected via a capacitor 46 to the reset input of position R4 and is also connected to an input of the logical AND circuit 50. The output of logical AND circuit 50 is connected to an output terminal 51.

The indication that position R5 is set will not be reflected at the output terminal 51 until logical AND circuit 50 is properly conditioned. Logical AND circuit 50 is conditioned when a readout control signal is applied to readout control terminal 55 which is connected to an input of logical AND circuit 50. In order to properly condition the logical AND circuit 50, the readout control signal must be positive going. The trailing edge of the readout control signal is utilized to reset the register position R5. The readout control terminal 55 is connected to an input of an inverter 56 which has its output connected to the A.C. reset terminal of position R5, through a capacitor 57.

Figure 2:
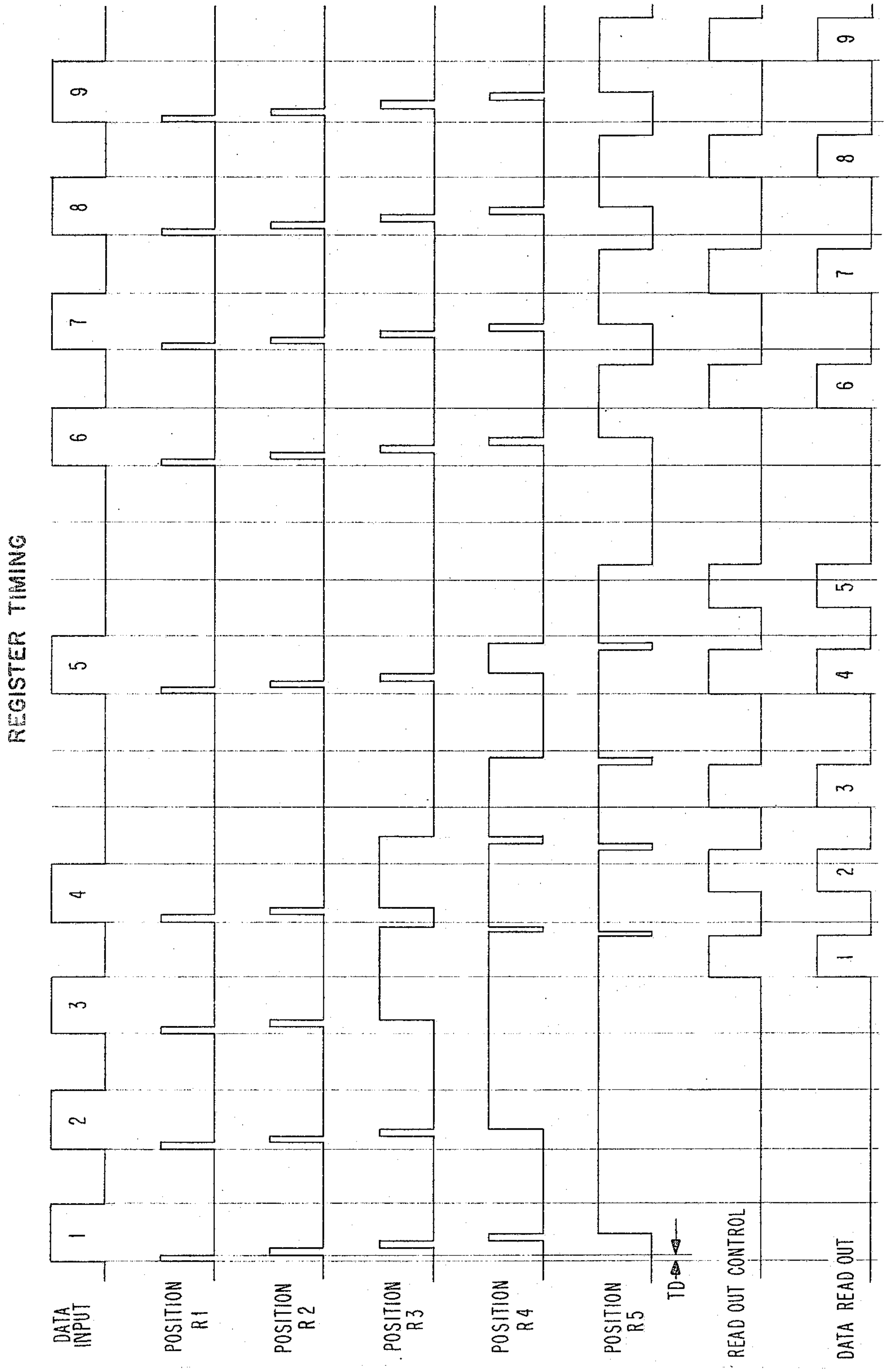
FIG. 2 is a timing diagram of the signals involved in the operation of the register in FIG. 1.

The operation of register 10 can be more fully understood with reference to both FIGS. 1 and 2. With register 10 reset, the leading edge of the data input bit No. 1 applied to terminal 20 will be passed by logical AND circuit 22 to set the register position R1. Shortly after position R1 is set, position R2 becomes set. The delay time between the setting of position R1 and R2 is equal to the time involved in the turning on of a position. This time may be referred to as TD. As position R2 is set, position R1 is reset by the leading edge of a signal produced by R2 becoming set. After the setting of position R2, position R3 is set and the setting of position R3 causes the resetting of position R2. Similarly, position R4 becomes set right after position R3 has been set and the setting of position R4 causes the resetting of position R3. Position R5 becomes set right after the setting of position R4 and the setting of position of R5 causes the resetting of position R4.

It is thus seen that the first data bit entered into the register will propagate from position R1 to position R2 to position R3 to position R4 and reside in position R5 and positions R1, R2, R3 and R4 will be in the reset condition. If the data bit in position R5 is not readout before the next data bit is entered into register 10, the next data bit entered into register 10 will propagate from register position R1 to position R2 to position R3 and reside in position R4. Thereafter, positions R1, R2 and R3 will be in the reset condition.

In FIG. 2, it is seen that three data bits have been entered into the register 10 before the first data bit has been readout therefrom. Further, it is seen that the first data bit is readout from position R5 in the period of time between the entry of data bits 3 and 4. Upon reading data bit No. 1 out from position R5, the data bit No. 2 in position R4 advances to position R5 and the data bit No. 3 in position R3 transfers to position R4. Thereafter, when the fourth bit of data is entered into register 10, it transfers from position one to position two to position three to reside therein.

During the entry of the fourth bit of data into register 10, the second bit of data entered into register 10 is readout therefrom. After the second bit of data is readout from position five of the register, i.e., upon the fall of the readout command signal, the position R5 is reset and thereafter, is set because R4 is still set. Upon position R5 becoming set, position R4 is reset. Thereafter, position R4 becomes set because position R3 is still set. The setting of position R4 causes the resetting of position R3. Positions R1 and R2 have already been reset. Thus, the status of the register 10 at this time is that data bits 1 and 2 have been read from the register and data bits 3 and 4 are residing in positions R5 and R4 respectively.

From FIG. 2, it is seen that the third bit of data in the register is readout prior to the entry of the fifth bit of data into the register. Upon reading out the third bit of data from the register, the register position R5 is reset and then set by position R4. The setting of position R5 causes the resetting of position R4. Hence, at this time, only position R5 of the register will be set to represent data bit 4 and data bits 1, 2 and 3 will have been readout of the register. Data bit 4 is readout during the entry of data bit 5. As data bit 5 is entered into the register, position R1 becomes set, position R2 then becomes set, position R1 becomes reset, position R3 becomes set, and position R2 is reset. With position R3 set, position R4 becomes set. Thereafter, position R3 is reset and position R4 remains set. Position R5 then becomes reset after data bit 4 has been read from the register. With position R5 reset, it becomes set because position R4 is set. After the setting of position R5, position R4 is reset. Hence, at this time, data bit 5 will be in the register and position R5 will be the only position set, positions R1, R2, R3 and R4 will be reset. Data bit 5 is subsequently readout from the register and thereafter data bits 6, 7, 8 and 9 are readin and readout respectively.

From the foregoing, it is seen that the first bit readin advances automatically to the first available position nearest the output of the register. Further, it is seen that the first bit read into the register is the first bit readout from the register. Further, it is seen that a bit can be entered into the register while another bit is read from the register. It is also seen that data bits can be packed adjacent to each other in the register, even though the bits are not entered in uniform succession.

This particular embodiment of the register is useful in those instances where control bits of information are required to be stored and thereafter are to be utilized in the order in which they were stored.

In many instances, it will be desirable to store data characters in the register. Under these conditions, the register will take the form shown in either FIG. 3 or FIG. 5. In FIG. 3, register 100 consists of four positions and each position includes four bistable elements such as triggers or latches for representing information according to a binary code. Of course, each position could contain any number of bistable elements for representing characters according to any suitable code. In FIG. 3, the bistable elements are triggers, each having a D.C. set terminal and an A.C. reset terminal.

Terminals 101, 102, 103 and 104 are adapted to receive signals for representing binary bits 1, 2, 4 and 8 respectively. The terminals 101, 102, 103 and 104 are connected as inputs to logical AND circuits 105, 106, 107 and 108 respectively. The outputs of logical AND circuits 105, 106, 107 and 108 are connected to the set inputs of triggers TA1, TA2, TA4 and TA8 respectively. The logical AND circuits 105, 106, 107 and 108 are conditioned by the states of the triggers TA1, TA2, TA4 and TA8. This is accomplished by connecting the set outputs of the triggers TA1, TA2, TA4 and TA8 to inputs of a logical OR circuit 110 which has its output connected to an input of an inverter 111. The output of the inverter 111 is connected to inputs of logical AND circuits 105, 106, 107 and 108. By this circuit arrangement, logical AND circuits 105, 106, 107 and 108 will be conditioned to pass signals received on terminals 101, 102, 103 and 104 when none of the triggers TA1, TA2, TA4 and TA8 are set. If any of the triggers TA1, TA2, TA4 and TA8 are set, this is indicative that there is a character of information in the particular position of the register, and hence, another character could be entered into that position of the register until that position of the register has been reset.

The triggers TB1, TB2, TB4 and TB8 making up the second position of the register have their set terminals connected to the outputs of logical AND circuits 115, 116, 117 and 118 respectively. The logical AND circuits 115, 116, 117 and 118 have inputs connected to the set outputs of triggers TA1, TA2, TA4 and TA8 respectively. The latter mentioned logical AND circuits are conditioned in a manner similar to those logical AND circuits controlling the triggers for the first position of the register. The set outputs of triggers TB1, TB2, TB4, and TB8 are connected to inputs of a logical OR circuit 120, which has its output connected to an input of an inverter 121. The output of inverter 121 is connected to inputs of logical AND circuits 115, 116, 117 and 118. The output of logical OR circuit 120 is also connected via capacitors 122, 123, 124 and 125 to the reset terminals of triggers TA1, TA2, TA4 and TA8. Hence, when any one of the triggers TB1, TB2, TB4 or TB8 is set, all the triggers TA1, TA2, TA4 and TA8 are reset, and the logical AND circuits 105, 106, 107 and 108 will again be conditioned for passing signals applied to input terminals 101, 102, 103 and 104, thereby enabling a second character to be entered into the register. The triggers TB1, TB2, TB4 and TB8 will be set if any of the corresponding triggers TA1, TA2, TA4 and TA8 have been set. This is how a character entered into the register transfers from the first position to the second position. The delay time between the setting of the triggers, such as TA1 and the corresponding trigger TB1, equals the time delay for turning on trigger TA1. Hence, the character entered into the register 100 will propagate automatically in a very short period of time from the first position to the second position and as it will be seen shortly, it will also propagate automatically from the second position to the third position and from there to the fourth position, and then remain in the fourth position until readout therefrom under separate control. With the first character in the fourth position of the register 100, positions one, two and three will be reset, and the next character entered into the register will propagate from position one to position two to position three and then reside in position three.

The third position of the register consists of triggers TC1, TC2, TC4 and TC8. Triggers TC1, TC2, TC4 and TC8 have their set terminals connected to outputs of logical AND circuits 130, 131, 132 and 133, respectively. Logical AND circuits 130, 131, 132 and 133 are conditioned by the states of triggers TC1, TC2, TC4 and TC8. The set outputs of triggers TC1, TC2, TC4 and TC8 are connected to inputs of a logical OR circuit 135, which has its output connected to an input of an inverter 136. The output of inverter 136 is connected to inputs of logical AND circuits 130 and 131, 132 and 133. Thus, a character can be entered in position three of the register from position two of the register if none of the triggers TC1, TC2, TC4 or TC8 are set. To facilitate the transfer of a character from the second to the third position of the register, the set outputs of triggers TB1, TB2, TB4 and TB8 are connected to inputs of logical AD circuits 130, 131, 132 and 133 respectively. The output of logical OR circuit 135 is also connected to the reset terminals of triggers TB1, TB2, TB4 and TB8. Hence, after a character has been transferred from the second position of the register to the third position of the register, the second position of the register will be reset.

Similar to the other positions of the register, the fourth position of the register consists of triggers TD1, TD2, TD4 and TD8, which have their set terminals connected to outputs of logical AND circuits 140, 141, 142 and 143. The set outputs of triggers TD1, TD2, TD4 and TD8 are connected to inputs of a logical OR circuit 145 which has its output connected to the input of inverter 146. The output of inverter 146 is connected to inputs of logical AND circuits 140, 141, 142, 143, which also have inputs from the triggers TC1, TC2, TC4 and TC8 respectively. The output of logical OR circuit 145 is also connected to the reset inputs of triggers TC1, TC2, TC4 and TC8. Hence, when a character is automatically propagated from position three to position four of the register, thereafter position three of the register will be reset.

The set outputs of triggers TD1, TD2, TD4 and TD8 are connected to inputs of logical AND circuits 160, 161, 162 and 163 respectively. The logical AND circuits 160, 161, 162 and 163 also have inputs connected to a readout control terminal 165 which is adapted to receive a readout control signal. The fall of the readout control signal is utilized to reset triggers TD1, TD2, TD4 and TD8. This is accomplished by connecting the terminal 165 to an input of inverter 166 which has its output connected to the reset terminals of the triggers TD1, TD2, TD4 and TD8. This arrangement prevents the entry of another character into position four of the register before the character already in that position has been readout. The outputs of logical AND circuits 160, 161, 162 and 163 are connected to output terminals 170, 171, 172 and 173 respectively.

Figure 4:
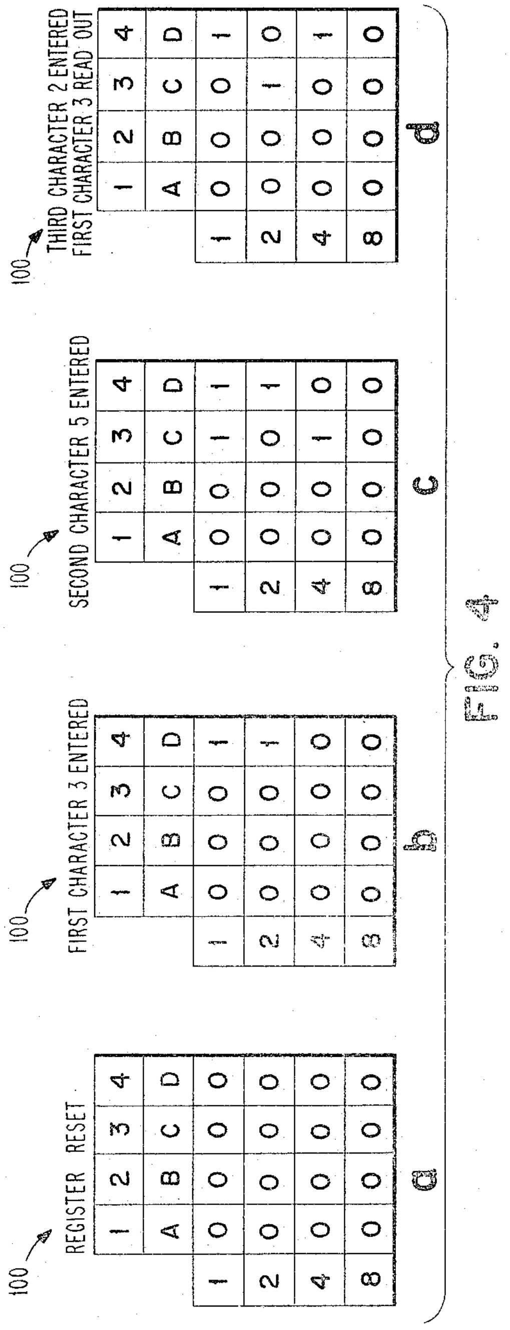

The progression of data within register 100 is illustrated in FIGS. 4*a*, 4*b*, 4*c* and 4*d*. The register 100 in FIG. 4*a* is shown in its reset condition. The numeric character 3 is the first character entered into the register 100 and this is illustrated in FIG. 4*b*. It is seen that the first character propagates from position one to position two to position three and resides in position four of the register. Before the first character entered into register 100 is readout therefrom, a second character 5 is entered into the register, as shown in FIG. 4*c*. FIG. 4*d* is illustrative of the condition of the register where the first character entered therein has been readout and a third character has simultaneously been readin.

In some instances, it may be desirable to utilize latches for the multi-bit per position register rather than triggers. In such an instance, the conditioning of the latches for accepting data is under the control of triggers, there being a trigger for each position in the register. The triggers are gated A.C. set and reset type. The A.C. reset of each trigger is supplied by a succeeding trigger changing from its zero state to its one state. The reset gate on all triggers is always in the on condition. The set gate of each trigger except the trigger associated with the first position of the register is supplied by the on condition of its preceding trigger. The A.C. set input to all even and odd triggers is supplied by the true and complement outputs, respectively, of an oscillator. The oscillator frequency is chosen such that the time required to propagate a character from the first storage position to the last storage position is less than the input or output character rate.

With reference to FIG. 5, each storage position in the register 175 consists of four latches. Since each position is substantially identical, only the first and last position of the register will be described in detail. The set and reset inputs of each latch for each position are connected to the outputs of logical AND circuits. These logical AND circuits are conditioned by the associated trigger, for example, AND circuits 180 connected to the set and reset inputs of the latches for the first position are connected to the reset output of trigger T1. The AND circuits connected to the set and reset outputs for the second, third and fourth positions of the register are connected to the reset outputs of triggers T2, T3 and T4 respectively. The set and reset outputs of the first position of the register are connected to the AND circuits of the second position of the register 175. Likewise, the set and reset outputs of the second position of the register are connected to the AND circuits of the third position and the outputs of the third position are connected to the AND circuits for the fourth position. The set and reset outputs of the fourth position of the register are connected to logical AND circuits 200, which also have an input connected to a readout control terminal 205 which is adapted to receive a readout control signal. It is obvious that the set and reset outputs are connected to different logical AND circuits 200 and hence, further detailed description as to its particular connection is not necessary. The logical AND circuits 200 also have an input connected to the set output of trigger T4.

The D.C. gate of trigger T1 is connected to a terminal 210 for receiving a character gate signal. The character gate signal will be applied to terminal 210 whenever a character is entered into the first position of the register 175. The set A.C. input of trigger T1 is connected to the complementary output of control trigger TX. The inputs of control trigger TX are binary connected to the output of an oscillator 215. With a character gate signal applied to terminal 210 so as to condition the D.C. gate of trigger T1, then trigger T1 will be switched to the set state when control trigger TX switches to the complementary state. Hence, a character can be entered into the first position of the register 175 when trigger T1 is in the zero state.

The entry of a character into the first position of the register will be accompanied by a character gate signal and this character gate signal in combination with the complementary output signal from control trigger TX will cause trigger T1 to switch to its one state, thereby blocking the input of another character into the first position of the register. The first character entered into position one of the register will propagate to the second position of the register because trigger T2 will initially be in its reset state. This is also true for triggers T3 and T4. Trigger T2 has its D.C. gate connected to the set output of trigger T1 and since trigger T1 has been switched to its set state, trigger T2 will be in condition to be switched and will be switched when control trigger TX switches to its true state upon receiving an impulse from oscillator 215.

When trigger T2 switches to its set state, it causes the resetting of trigger T1 because the set output of trigger T2 is connected to the A.C. reset input of trigger T1. The character in the second position of the register will now transfer to the third position of the register because trigger T3 is in the reset state. Additionally, the set output of trigger T2 is connected to the D.C. gate of trigger T3, hence, conditioning the same for being set. The A.C. input of trigger T3 is connected to the complementary output of the control trigger TX. Therefore, when control trigger TX switches from its true state to its complementary state, the trigger T3 will switch to its set state. It should be noted that trigger T3 could not have been switched to its set state previously, even though the control trigger TX has been switching from its true to its complementary state and vice versa, because the D.C. gate of trigger T3 was not conditioned until trigger T2 was switched to its set state. The set output of trigger T3 is connected to the A.C. reset input of trigger T2, thereby causing the resetting of the same when trigger T3 is set. It should also be noted that the first position of the register was again conditioned to accept a second character when trigger T2 switched to its set state.

The character in position three will transfer to position four because the trigger T4 is in its reset state. The set output of trigger T3 is connected to the D.C. gate of trigger T4. Hence, with trigger T3 in its set state, trigger T4 will be conditioned to be set. The A.C. set input of trigger T4 is connected to the true output of control trigger TX. Accordingly, when control trigger TX switches from its complementary to its true state, the trigger T4 will be set.

With trigger T4 in its set state, position four will be inhibited from accepting another character. The A.C. reset input of trigger T4 is connected to the output of an inverter 220 which has its set input connected to the readout control terminal 205. By this arrangement, a character in position four of the register 175 will remain in position four until a readout control signal is applied to terminal 205. The trailing edge of the readout control signal will be inverted by inverter 220, thereby causing the resetting of trigger T4. This permits sufficient time for a character to be gated out of position four. Thus, with trigger T4 in its reset state, position four of the register will be conditioned to accept another character. Hence, if a second character were entered into the register while a first character was still in position four, the second character will propagate from position one to position two to position three and reside in position three. Similarly, if a third character is entered into the register before either the first or second character is readout therefrom, the third character will propagate from position one to position two. If a fourth character is entered into the register before the readout of the first, second or third character, the fourth character will enter into position one and remain therein. When the character is readout from the register, by means of a readout control signal being applied to terminal 205, all other characters in the register will shift toward the output one position. The register should have a sufficient number of positions to accommodate the desired data readin and readout rate.

From the foregoing, it is seen that this invention provides for a data register wherein data entered into the register propagates to the first non-occupied position closest to the output of the register. Further, it is seen that the register can either be single or multi-bit. The register can be self-propagating or the propagation can be controlled by another register.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data register comprising:
a plurality of bistable devices each having a D.C. gated set input and an A.C. reset input and set and reset outputs;
means connecting the reset output of each bistable device to said D.C. gated input thereof;
an input terminal connected to the D.C. set input of the first of said plurality of bistable devices;
means for connecting said set outputs of preceding bistable devices to said D.C. set inputs of succeeding bistable devices whereby when a preceding bistable device is in its set state and a succeeding bistable device is in its reset state, said succeeding bistable device is switched to its set state;
means connecting said set outputs of said succeeding bistable devices to said A.C. reset inputs of said preceding bistable devices whereby upon the setting of said succeeding bistable devices said preceding bistable devices are reset to again be conditioned for being set;
means gating the set output of the last of said plurality of bistable devices; and
means for connecting said gating means to the A.C. reset of said last bistable device to reset the same upon said gating means going off.

2. A data register comprising:
a plurality of data settable devices for representing data in coded form for each position of said register, each data settable device having set and reset inputs and outputs;
a plurality of gates connected to said set inputs of said plurality of data settable devices for each register position;
logic means connected to said set outputs of said plurality of data settable devices for each register position and operable to indicate if any of said settable devices are set;
means connecting said logic means to said gates whereby the same are inhibited if any settable device is set;
means connecting said set outputs of said plurality of data settable devices of preceding positions to said plurality of gates of succeeding positions to facilitate transfer of data from position to position;
data input means connected to the plurality of gates of the first register position;
means connecting said logic means for succeeding register positions to reset inputs of preceding register positions whereby upon transfer of data from preceding to succeeding positions causes resetting of said preceding positions;
selectively operable output means connected to the set outputs of the plurality of data settable devices of the last register position whereby upon being rendered operable, data transfers from said last position; and
means connecting said output means to the reset inputs of the plurality of data settable devices of said last register position and operable to reset said plurality of data settable devices of said last register position after data is transferred therefrom.

3. A data register comprising:
a plurality of triggers per register position, each trigger having set and reset inputs and outputs;
a plurality of gates connected to said set inputs of said plurality of triggers for each register position;
logic means connected to said set outputs of said plurality of triggers for each register position and operable to indicate if any of said triggers are set;

means connecting said logic means to said gates whereby the same are inhibited if any trigger is set;
means connecting said set outputs of said plurality of triggers of preceding positions to said plurality of gates of succeeding positions to facilitate transfer of data from position to position;
data input means connected to the plurality of gates of the first register position;
means connecting said logic means for succeeding register positions to reset trigger inputs of preceding register positions whereby upon transfer of data from preceding to succeeding position causes resetting of said preceding positions;
selectively operable output means connected to the set outputs of the plurality of triggers of the last register position whereby upon being rendered operable data transfers from said last position; and
means connecting said output means to the reset inputs of the plurality of triggers of said last register position and operable to reset said plurality of triggers of said last register position after data is transferred therefrom.

4. The data register of claim 3 wherein said logic means includes a logical OR circuit and an inverter connected to the output of said logical OR circuit.

5. In combination, a data register having a plurality of positions each position consisting of a plurality of bistable settable devices to represent data in coded form;
a control register having a plurality of positions each position consisting of a bistable settable device;
a plurality of gates connected to said plurality of settable devices for each position of said data register;
means inter-connecting the outputs of said plurality of settable devices with said plurality of gates to enable transfer of data from register position to register position when said gates are rendered operable;
means connecting the outputs of said settable devices of said control register to said plurality of gates of corresponding positions in said data register; and
means for setting and resetting said settable devices of said control register in succession whereby data propagates through all positions to the last position of the register.

6. The combination of claim 5 wherein said means for setting and resetting said settable devices of said control register first resets in succession all said settable devices of said control register except the last settable device to be set by the associated data whereby successive entries of data into said data register fills the register from the last position toward the first position.

7. The combination of claim 6 further comprising selectively operable output means connected to the last position of said data register whereby upon being rendered operable provides output signals indicative of the data in said last register position.

8. The combination of claim 7 wherein said output means is connected to the last settable device of said control register to reset the same after having been rendered operable for a predetermined period of time.

References Cited by the Examiner

UNITED STATES PATENTS

| | | | |
|---|---|---|---|
| 3,051,848 | 8/1962 | Clark | 307—88.5 |
| 3,051,855 | 8/1962 | Lee | 307—88.5 |
| 3,148,333 | 9/1964 | Simmons | 328—48 |
| 3,174,106 | 3/1965 | Urban | 328—37 |

ARTHUR GAUSS, *Primary Examiner.*

J. S. HEYMAN, *Assistant Examiner.*